United States Patent [19]
Tam

[11] Patent Number: 5,874,181
[45] Date of Patent: Feb. 23, 1999

[54] BATTERY CONTAINER

[76] Inventor: Clement Pui-Yin Tam, Unit 4, 395 Harry Walker Parkway (North), Newmarket, Ontario, Canada, L3Y 7B3

[21] Appl. No.: 976,052

[22] Filed: Nov. 21, 1997

[51] Int. Cl.⁶ .................................................. H01M 2/10
[52] U.S. Cl. ................................ 429/1; 429/99; 429/123
[58] Field of Search ................................ 439/1, 96, 99, 439/100, 121, 123

[56]   References Cited

U.S. PATENT DOCUMENTS

| | | | |
|---|---|---|---|
| 3,339,169 | 8/1967 | Freeland | 429/121 X |
| 4,160,857 | 7/1979 | Nardella et al. | 429/97 |
| 4,622,274 | 11/1986 | Lowrance | 429/1 |
| 4,678,728 | 7/1987 | Christopulos | 429/121 |
| 5,017,441 | 5/1991 | Lindner | 429/99 X |
| 5,489,486 | 2/1996 | Glover | 429/99 X |

FOREIGN PATENT DOCUMENTS

| | | |
|---|---|---|
| 831719 | 3/1960 | United Kingdom . |
| 1396862 | 6/1975 | United Kingdom ............ H01M 2/10 |
| 1487604 | 10/1977 | United Kingdom ............ H01M 2/02 |
| 1489528 | 10/1977 | United Kingdom ............ H01M 2/10 |
| 2 274 019 | 9/1994 | United Kingdom ............ H01M 2/10 |
| 2 304 975 | 3/1997 | United Kingdom ............ H01M 2/10 |

*Primary Examiner*—Anthony Skapars
*Attorney, Agent, or Firm*—Ridout & Maybee

[57]   ABSTRACT

A battery container for use with battery packs of different types having two terminals on one side, comprising a casing for accommodating at least one battery pack; the container has on its outer side two screw terminals for power take-off, and on its inner side two associated contacts electrically connected to the terminals, which contacts are arranged for electrical connection with the respective terminals of one or more battery packs when placed inside the casing in any one of at least two possible orientations.

11 Claims, 13 Drawing Sheets

BATTERY CONTAINER

The present invention relates to a battery container for use with a battery pack.

According to the invention, there is provided a battery container for use with at least one battery pack having two terminals on one side, which container comprises a casing for accommodating a said battery pack and having on its outer side two terminals and on its inner side two associated contacts electrically connected to the terminals, which contacts are arranged for electrical connection with the respective terminals of a said battery pack when a said battery pack is placed inside the casing in any one of at least two possible orientations, each terminal on the casing being provided by a screw and an associated nut.

Preferably, the casing is substantially box-like.

More preferably, the casing has a lid having opposite outer and inner sides on which the casing terminals and contacts are provided, respectively.

Preferably, the contacts are elongate and lie on substantially the same plane.

In a preferred embodiment, one of the contacts is provided substantially in a central position and the other contact is provided on one side.

In a preferred embodiment, one of the contacts extends substantially around the other contact.

The battery container may preferably include a contact adjuster provided by a plate and two contacts extending across opposite principal sides of the plate for connection between respective pairs of the casing contacts and battery terminals, irrespective of whether the contact adjuster is placed in any one of two possible orientations.

The invention will now be more particularly described, by way of example only, with reference to the accompanying drawings, in which.

Figure 1:
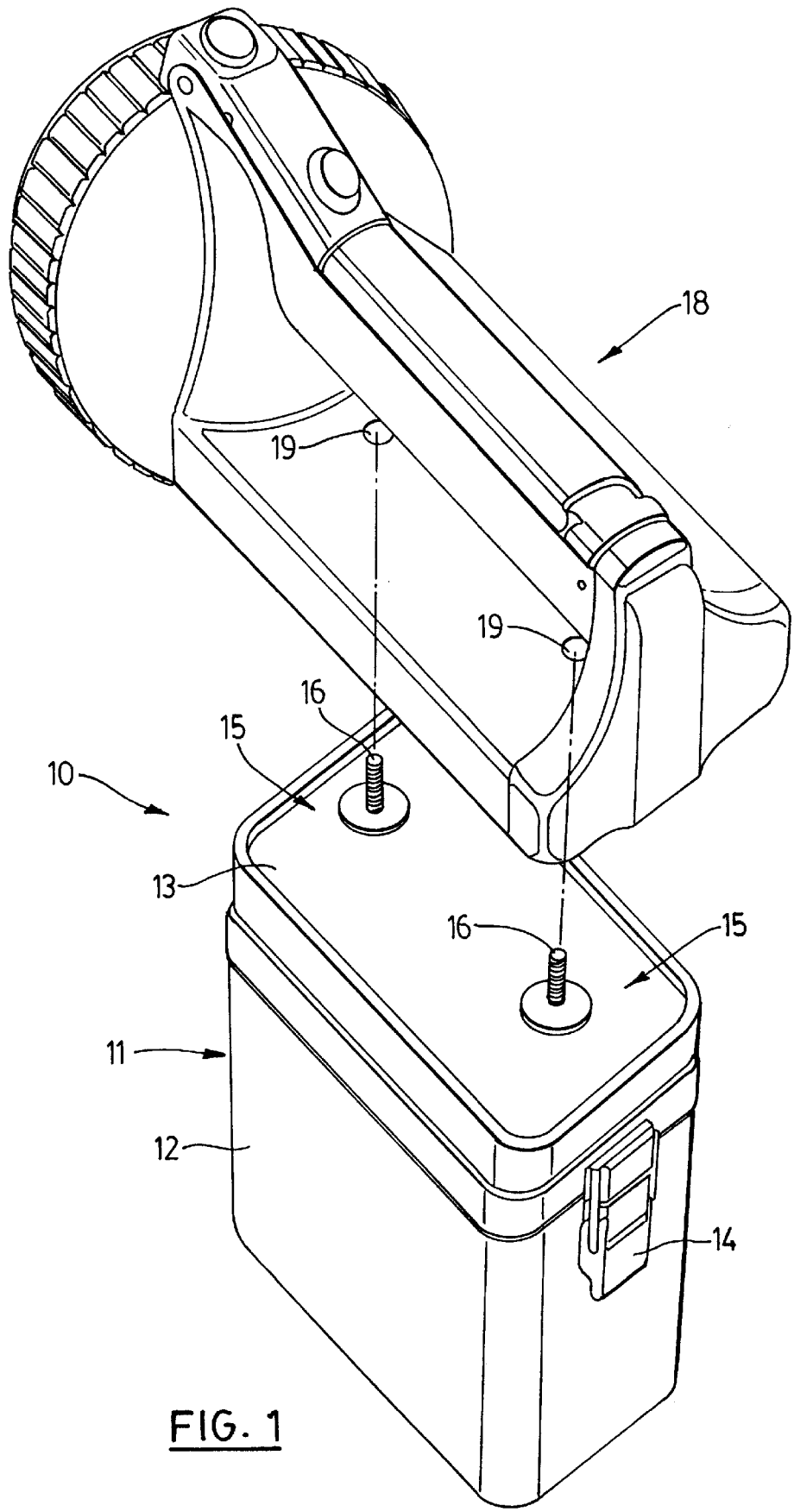
FIG. 1 is a perspective view of an embodiment of a battery container in accordance with the invention, together with a lantern for use thereon; in exploded view.

Referring firstly to FIGS. 1 to 5 of the drawings, there is shown a battery container 10 embodying the invention, which battery container comprises a box-like casing 11 having a base 12 and a top lid 13. The lid 13 is held closing the base 12 by a pair of buckles 14 on opposite sides. A pair of battery terminals 15 are provided upstanding through the lid 13, in the form of two screws 16 and associated nuts 17. In this particular embodiment, the terminals 15 are configured to resemble that of an existing battery pack of a type commonly known as NEDA No. 918 or IEC No. 4R25-2.

It is known to have electrical devices, for example a torch or lantern 18 as shown in FIG. 1, specially designed for use with such an existing battery of type NEDA No. 918 or IEC No. 4R25-2. The lantern 18 has a pair of bottom holes 19 which are arranged to be disposed over and engaged with the corresponding terminals of the battery pack. The holes 19 are associated with contacts in electrical connection with the terminals of the lantern 18 such that when the lantern 18 is fitted, as aforesaid, onto the battery pack, it is also electrically connected to and ready for use as a combined lighting unit with the battery pack.

In this particular embodiment, the casing 11 of the battery container 10 is designed to accommodate a pair of standard battery packs 20 of a type commonly known as NEDA No. 941 or IEC No. 4R25. Each battery pack 20 stands upright and has a generally square horizontal cross-section. A pair of battery terminals 21 and 22, in the form of upstanding coil springs, are provided on the top side of each battery pack 20, with the first terminal 21 positioned centrally and the second terminal 22 positioned off-centre towards one corner. The interior of the casing 11 is just sufficient to hold the pair of battery packs 20 together side-by-side, with each battery pack 20 standing upright in one of four different possible orientations.

The battery container 10 includes a contact arrangement 23 on the underside of the casing lid 13, which is provided by a straight first contact strip 24 and a U-shaped or rectangularly-looped second contact strip 25 lying on substantially the same plane. The first contact strip 24 is placed centrally of the lid 13, with the second contact strip 25 extending substantially symmetrically around the first contact strip 24. Both contact strips 24 and 25 are located by suitable spacer walls 26 at a small distance below the underside of the lid 13. One end of the inner contact strip 24 is connected by means of a short inwardly-bent tongue 27 (FIG. 5A) or an electrical wire 27A (FIG. 5C) to an adjacent terminal 15 of the battery container 10. The outer contact strip 25 has an inward tongue 28 which tips slightly upwards to extend to a position above the other end of the inner contact strip 24 and is secured to the other terminal 15 of the battery container 10.

Figure 3:
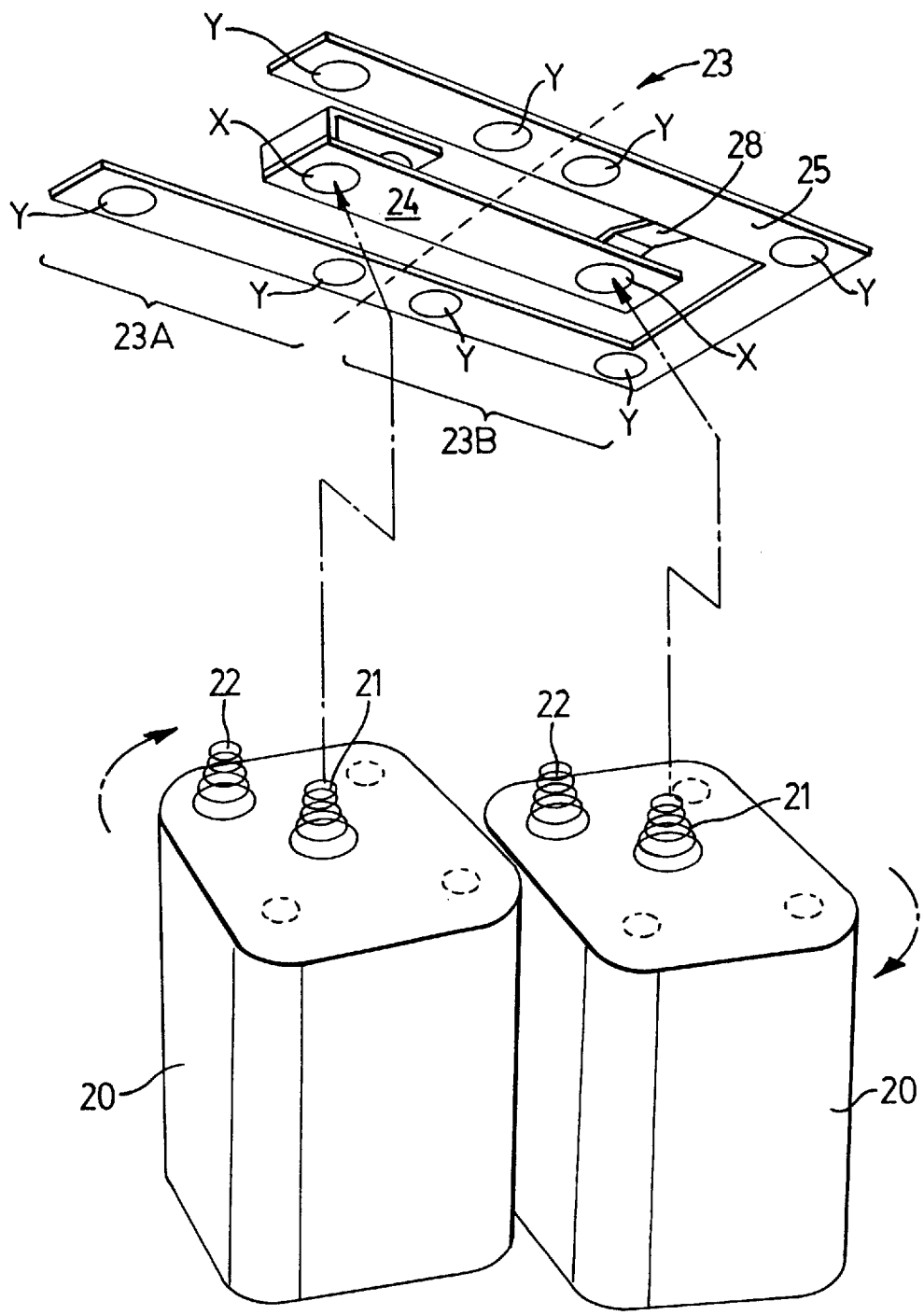
FIG. 3 is a perspective view of the battery packs and the contact arrangement of FIG. 2, illustrating different orientations of the battery pack.

The contact arrangement 23 may be seen as having imaginary left and right square portions 23A and 23B, with the opposite ends of the inner contact strip 24 reaching the centres (X) of the respective portions 23A and 23B and the outer contact strip 25 reaching the four corners (Y) of each portion 23A or 23B, as illustrated in FIG. 3. In this arrangement, irrespective of the orientation, each battery pack 20 will have its terminals 21 and 22 bearing against the contact strips 24 and 25, respectively, when placed inside the battery container 10. Proper connection of the terminals 21 and 22 of the battery packs 20 to the terminals 15 of the battery container 10 is thus ensured, without the need to worry about the orientation of the battery packs 20.

The battery container 10 is useful to convert two battery packs 20 of type NEDA No. 941 or IEC No. 4R25 into a battery pack of type NEDA No. 918 or IEC No. 4R25-2, at least insofar as the battery terminals are concerned, for use with the lantern 18 or other electrical devices.

Figure 2:
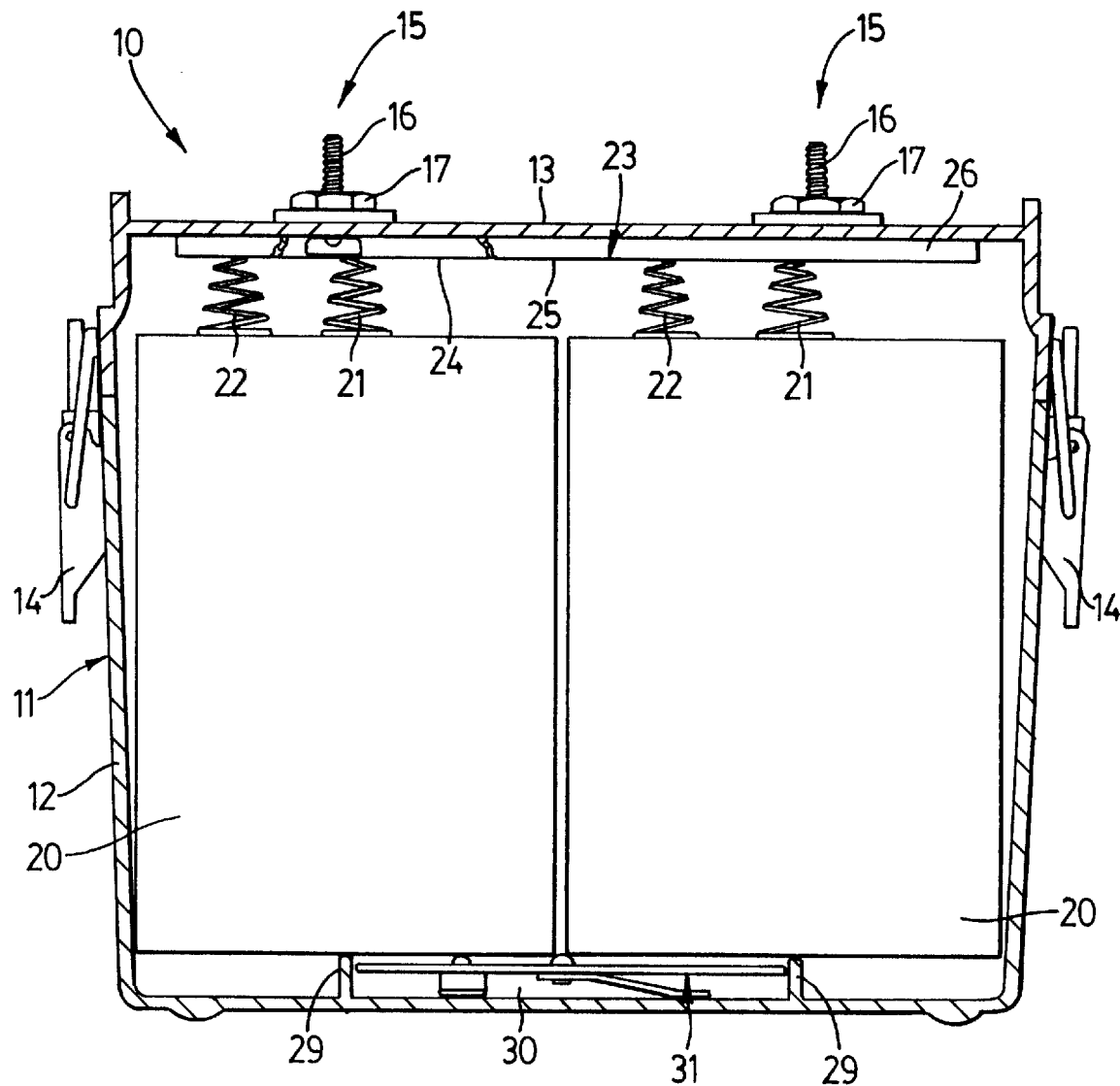
FIG. 2 is a cross-sectional side view of the battery container of FIG. 1, partially broken away to reveal detail, including two battery packs held therein and a contact arrangement.

As shown in FIG. 2, the casing base 12 has two pairs of integral bottom ribs 29 which cross each other in the form of a hatch sign to define a shallow central or sideway rectangular recess 30. A contact adjuster 31 is stored within the bottom recess 30, having a function to be described later.

Figure 4:
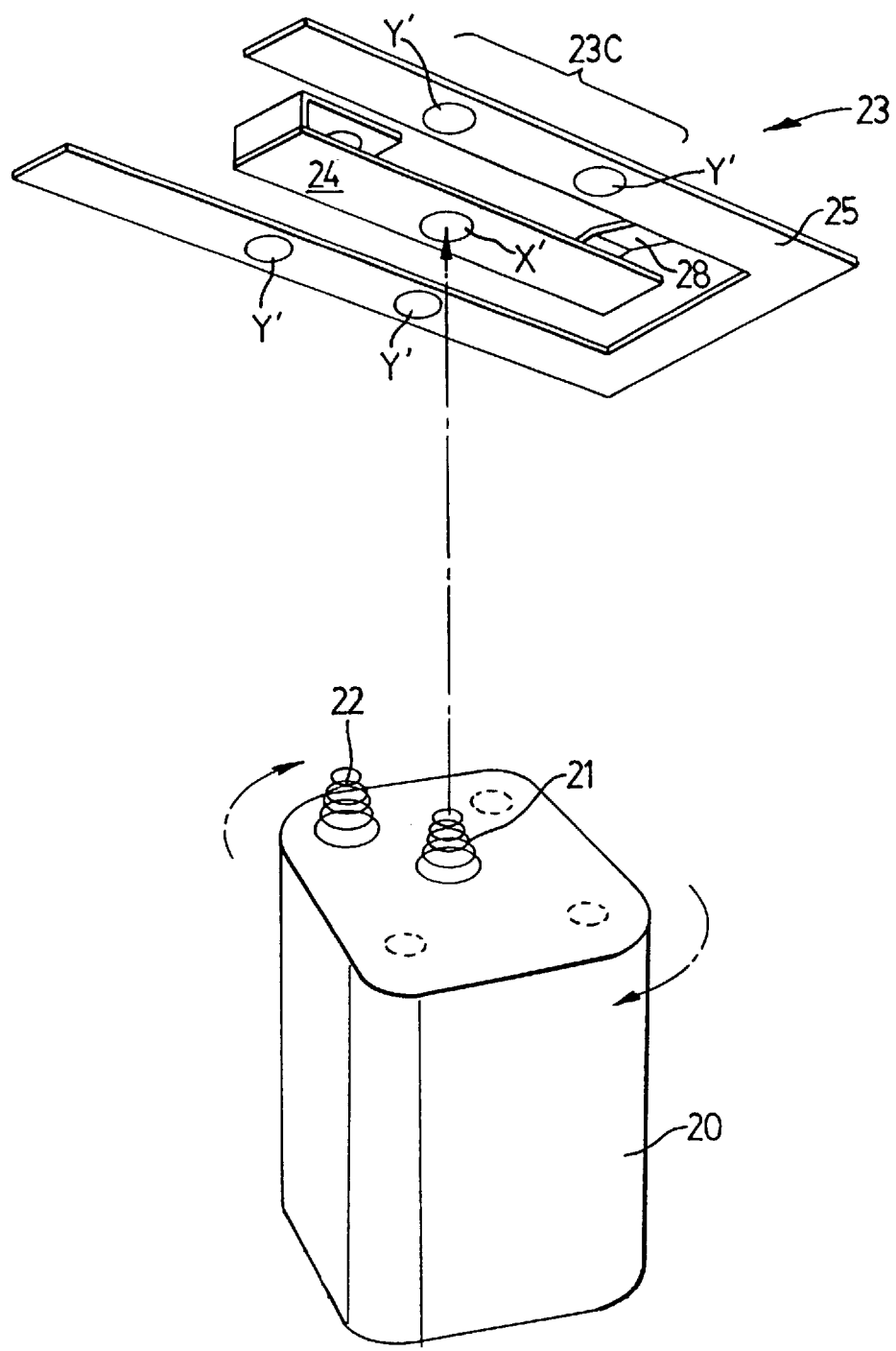
FIG. 4 is similar to FIG. 3, but shows a single battery pack.
Figure 5A:
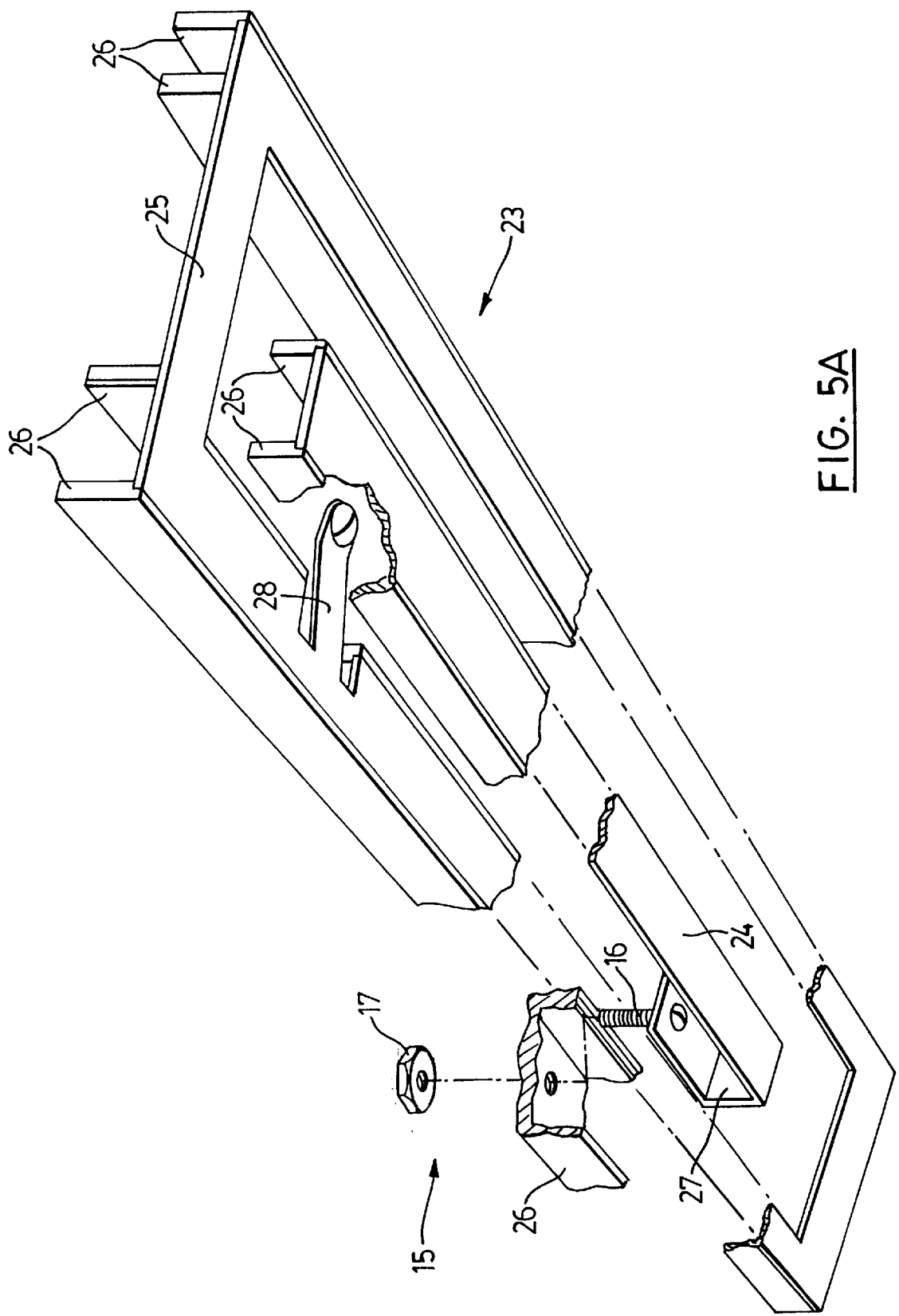
FIG. 5A shows in perspective view in enlarged, broken away form, the contact arrangement of FIG. 2.
Figure 5B:
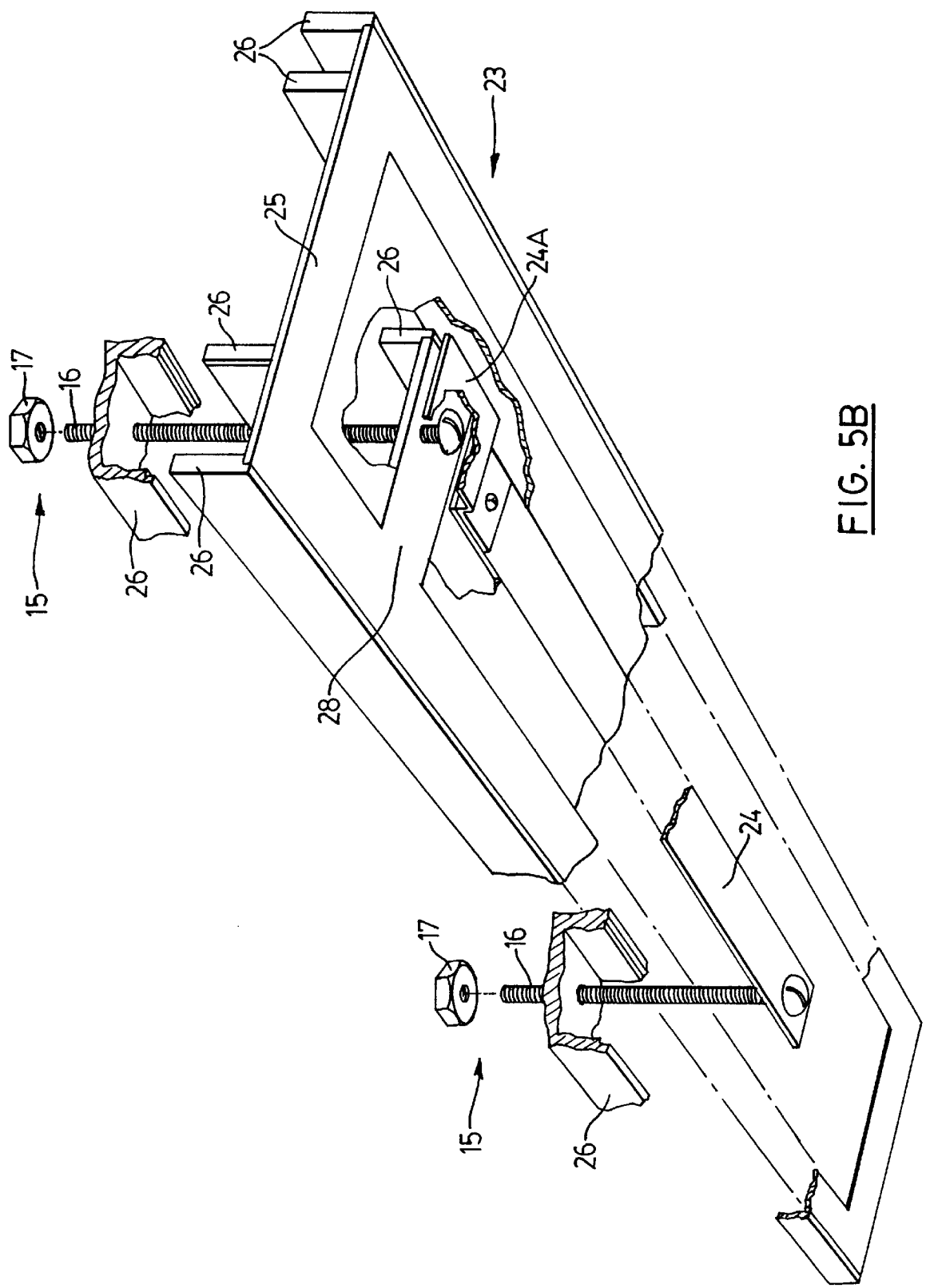
FIG. 5B is similar to FIG. 5A but shows a modified form of the contact arrangement.

It is also possible for the battery container 10 to accommodate a single said battery pack 20 for converting the same into a type NEDA No. 918 or IEC No. 4R25-2 battery pack. In use, the battery pack 20 is placed in a central position inside the casing 11, with its terminals 21 and 22 in electrical contact with an imaginary middle portion 23C of the contact arrangement 23 as illustrated in FIG. 4. The portion 23C has the inner contact strip 24 extending across a central contact position (X') for the first terminal 21 of the battery pack 20 and the outer contact strip 25 extending across four possible corner contact positions (Y') for the second terminal 22, thereby ensuring proper connection of the terminals 21 and 22 of the battery pack 20 to the terminals 15 of the battery container 10, irrespective of the orientation of the battery pack 20.

Figure 6A:
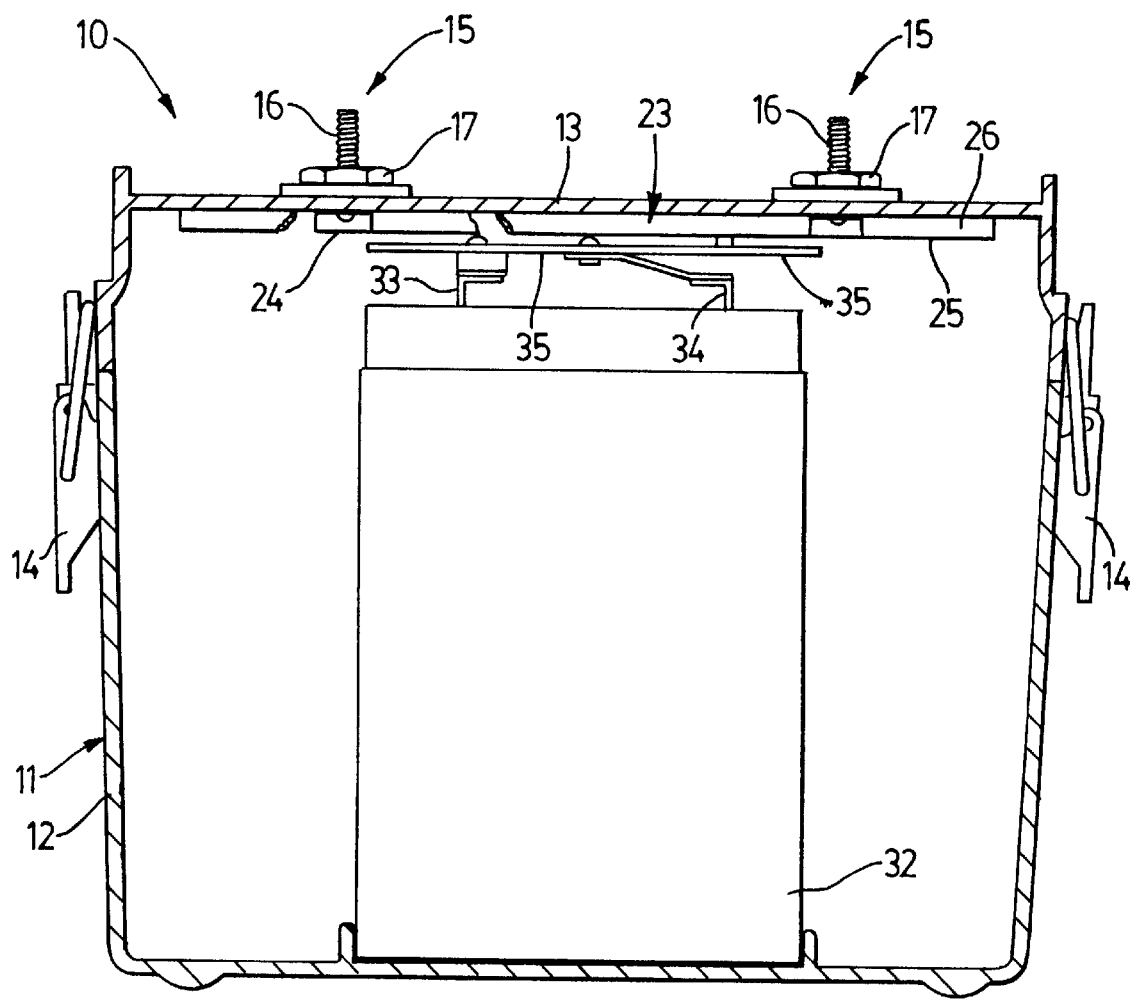
FIG. 6A is similar to FIG. 2, but shows a battery pack of a different type held inside the battery container by means of a contact adjuster.
Figure 5C:
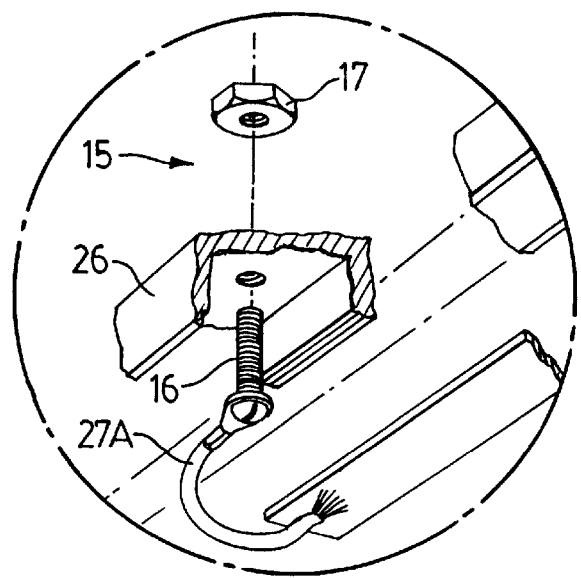
FIG. 5C shows a fragmentary portion of a still further modified form of the contact arrangement of FIG. 5A.
Figure 6B:
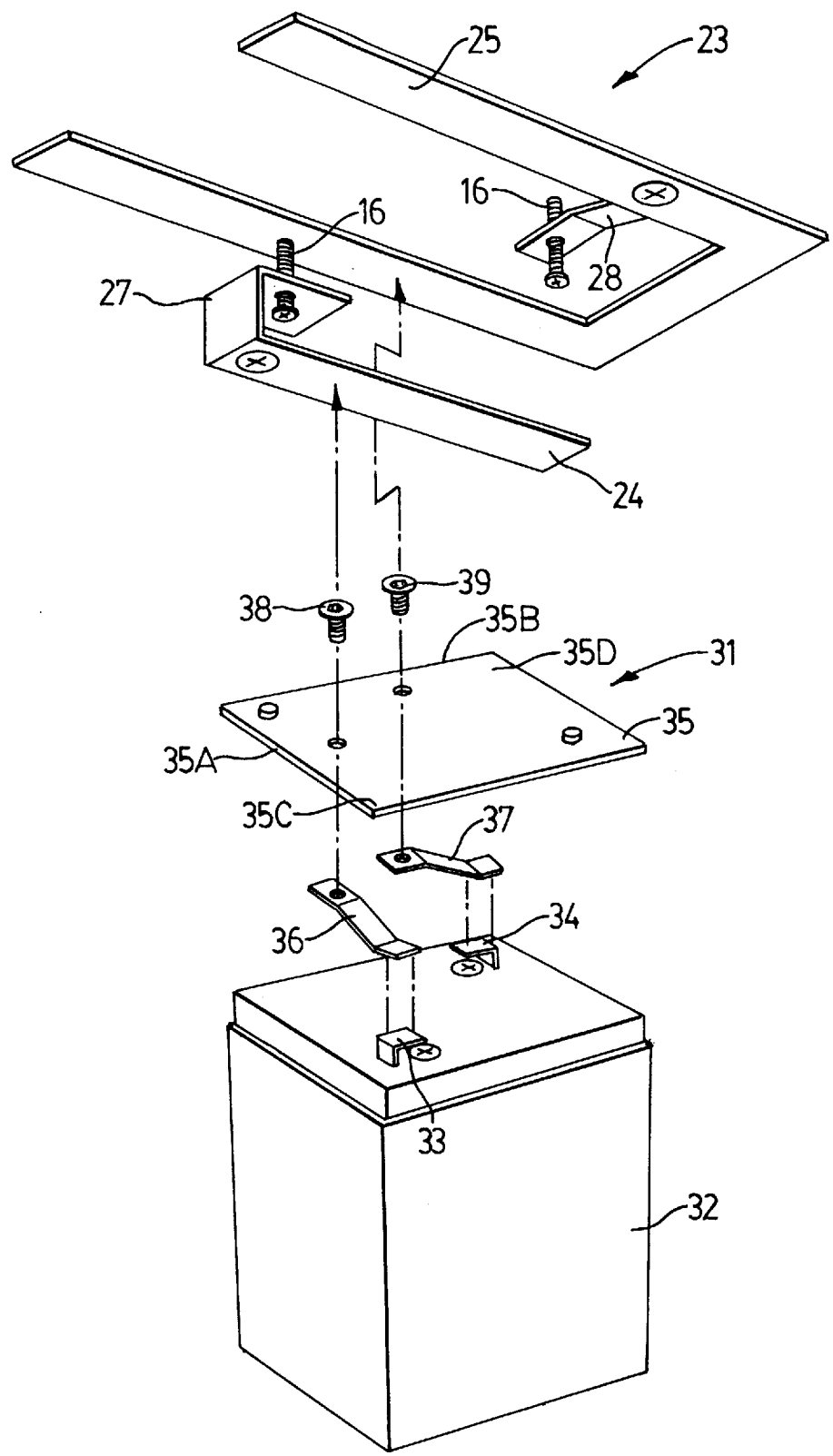
FIG. 6B is a perspective view of the contact arrangement and the battery pack of FIG. 6A in exploded form.

Referring now to FIGS. 6A and 6B of the drawings, the battery container 10 is also capable of converting another type or size, commonly known as 6V/4Ah or 6V/5Ah, of battery pack 32 into a type NEDA No. 918 or IEC No. 4R25-2 battery pack, with the use of the contact adjuster 31. The battery pack 32, having a rectangular horizontal cross-section, is placed inside the casing 11 in a central position upstanding from the bottom recess 30. By reason of its rectangular cross-section, the battery pack 32 can only be placed in one of two possible orientations, namely the one as shown or 180° turned round. The battery pack 32 has a pair of battery terminals 33 and 34 which are provided symmetrically at opposite corners of the top side. Thus, the positions of the terminals 33 and 34 are interchangeable whether the battery pack 32 is oriented in said one way or the other.

The contact adjuster 31 consists of basically a quadrate body plate of electrically non-conductive material by function and is size-wise, capable of being stored within the domiciliary bottom recess 30. On one side of which carries a pair of metal contacts 36/37 corresponding to the terminals 33/34 of battery pack 32 or its alternate, and on the reverse side of which carries another pair of metal contacts 38/39 corresponding to contact strips 24/24a and 25 within the inner side of the battery-container lid.

The metal contacts 36–38 and 37–39 or 36–39 and 37–38 are arranged in an electrically conductive relationship, by means of, for example, metal strips or metal laminates of a circuit board. By these means, the terminals 33/34 of battery pack 32 are connected electrically, indirectly though, to contact strips 24/24a and 25 and terminal screws 16 they associate to.

FIG. 6B is exemplary of the manner in which the contact adjuster 31 is formed by a rectangular plastic body plate 35 and two spring-leaf contacts 36 and 37 thereunder, for use on top of and in angular alignment with the battery pack 32. By reason of its rectangular shape, the contact adjuster 31 or body plate 35 can only be placed in one of two possible orientations, namely the one as shown or 180° turned round. The contacts 36 and 37 are secured, by respective electrically-conducting rivets 38 and 39, at their fixed ends to the centres of adjoining shorter and longer sides 35A and 35B, respectively, of the body plate 35. The rivets 38 and 39 are thus engageable with the inner and outer contact strips 24 and 25, correspondingly, irrespective of the orientation of the body plate 35. The contacts 36 and 37 extend at their respective free ends, dipping slightly downwards, to reach below symmetrical opposite corners 35C and 35D of the body plate 35, for coming in contact with the battery terminals 33 and 34, in one combination or the other, irrespective of how the body plate 35 is oriented.

Figure 7A:
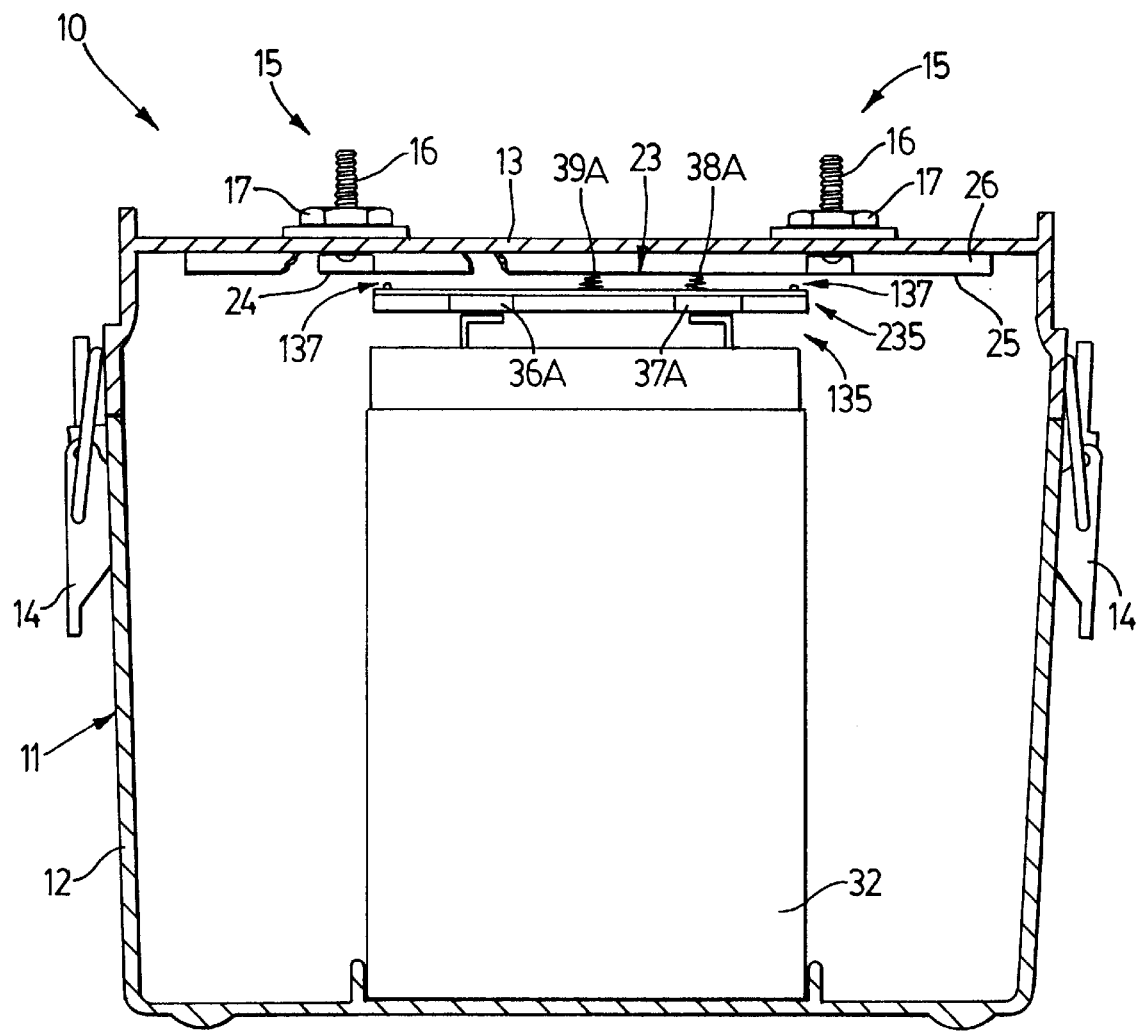
FIGS. 7A and 7B are similar to FIGS. 6A and 6B respectively, but show a different contact arrangement.
Figure 7B:
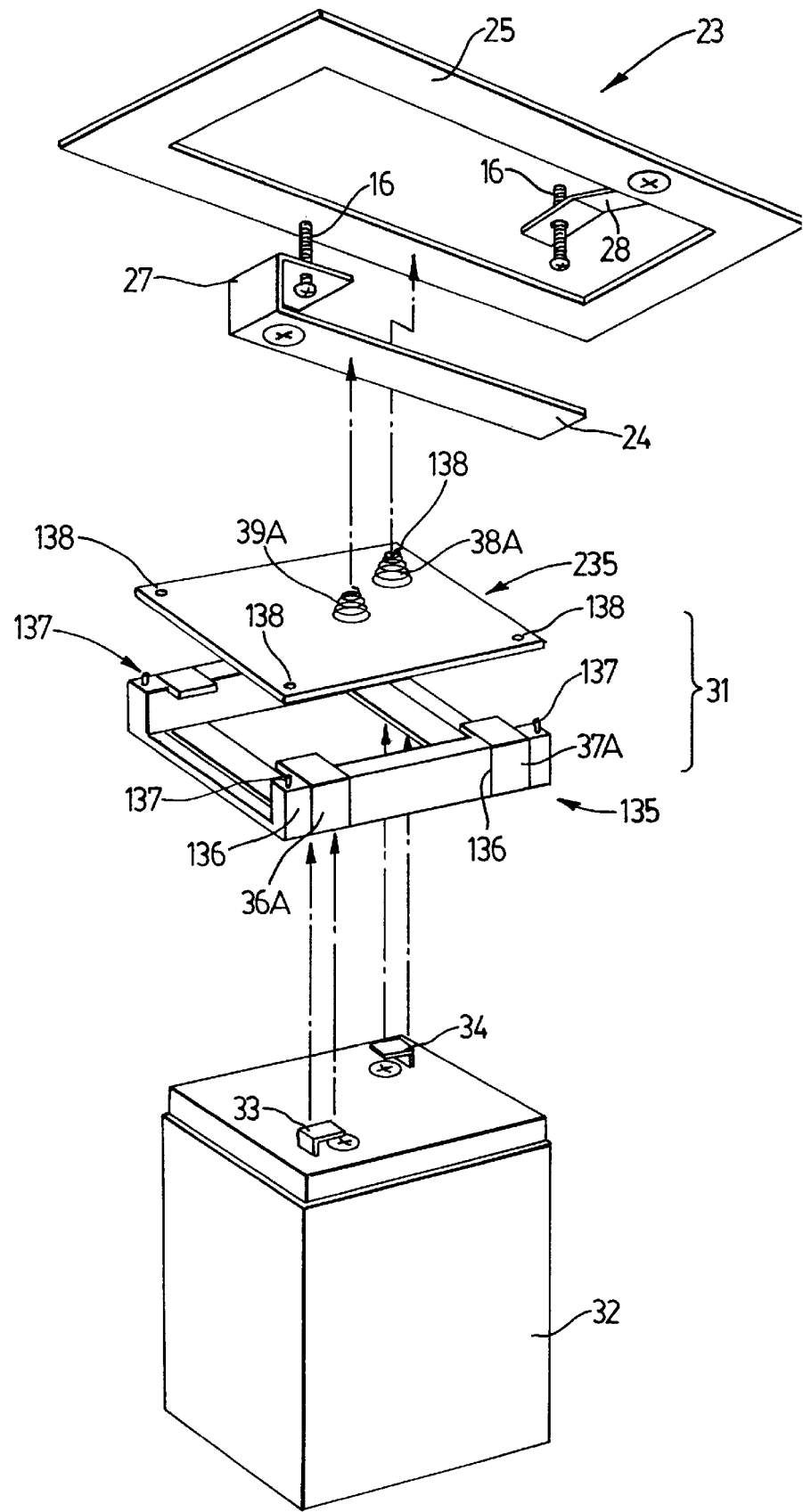

FIGS. 7A and 7B, by way of another example, illustrate that the contact adjuster 31 is formed by a frame-shape body plate 135 of plastic and circuit board 235. Two groove-bands 136 on the body plate 135, one apart from the other, at distance from their medians equivalent to that of terminals of battery pack 32, accept two C-shape metal contact strips 36a and 37a which will be placed on top of the corresponding terminals 33/34 of battery pack 32. The circuit board 235 on one side carries two coil springs 38a and 39a resembling coil springs 21 and 22 of battery pack 20, will be put in contact with contact strips 24/24a and 25. On its other side the metal laminates 40 and 41 (not shown) connect the coil springs 38a/39a into contacts with contact strips 36a and 37a, when it is stacked on top of the body plate with coil springs in upright positions. There is a pin 137 at each of the four corners of the body plate and a corresponding hole 138 at each of the four corners of the circuit board to hold the two pieces in position. When the adjuster is not in use, the circuit board may be inverted concealing the coil springs into the hollow space of the body plate making the adjuster as one unit for compact storage within bottom recess 30. For added features, re-charging receptacle and electronic components may be included in the circuit board.

In this arrangement, irrespective of the orientations of the batty pack 32 and the contact adjuster 31, the battery pack 32 will have its terminals 33 and 34 in electrical contact, via the contact adjuster 31, with the inner and outer contact strips 24/24A and 25, respectively, when placed inside the battery container 10, thereby ensuring proper connection of the terminals 33 and 34 of the battery pack 32 to the terminals 15 of the battery container 10. In effect, the contact adjuster 31 brings one battery terminal 33/34 to a central position relative to the casing lid 13 and the other battery terminal 34/33 to one side of the casing lid 13, for contact with the contact arrangement 23.

Figure 8A:
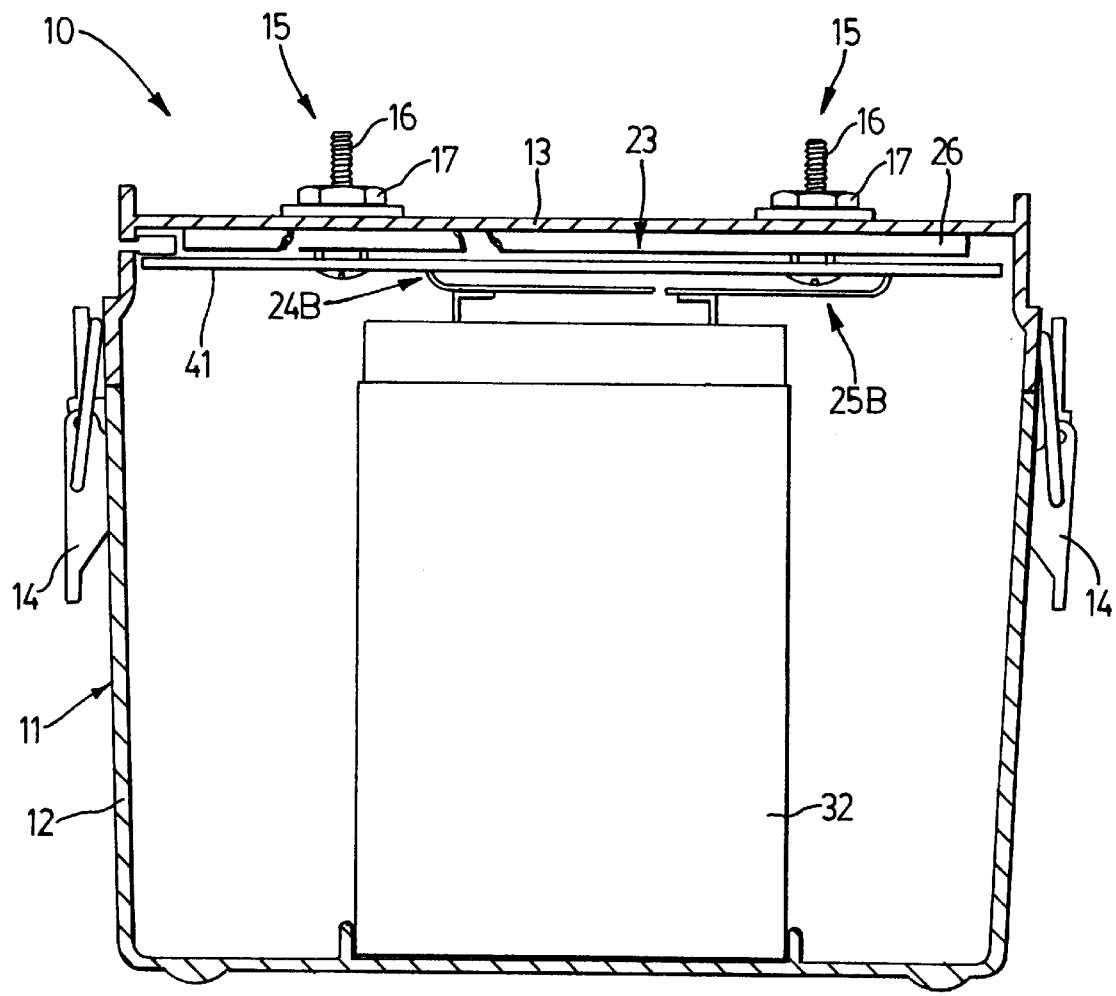
FIGS. 8A and 8B are similar to FIGS. 6A and 6B respectively, but show a still further contact arrangement.
Figure 8B:
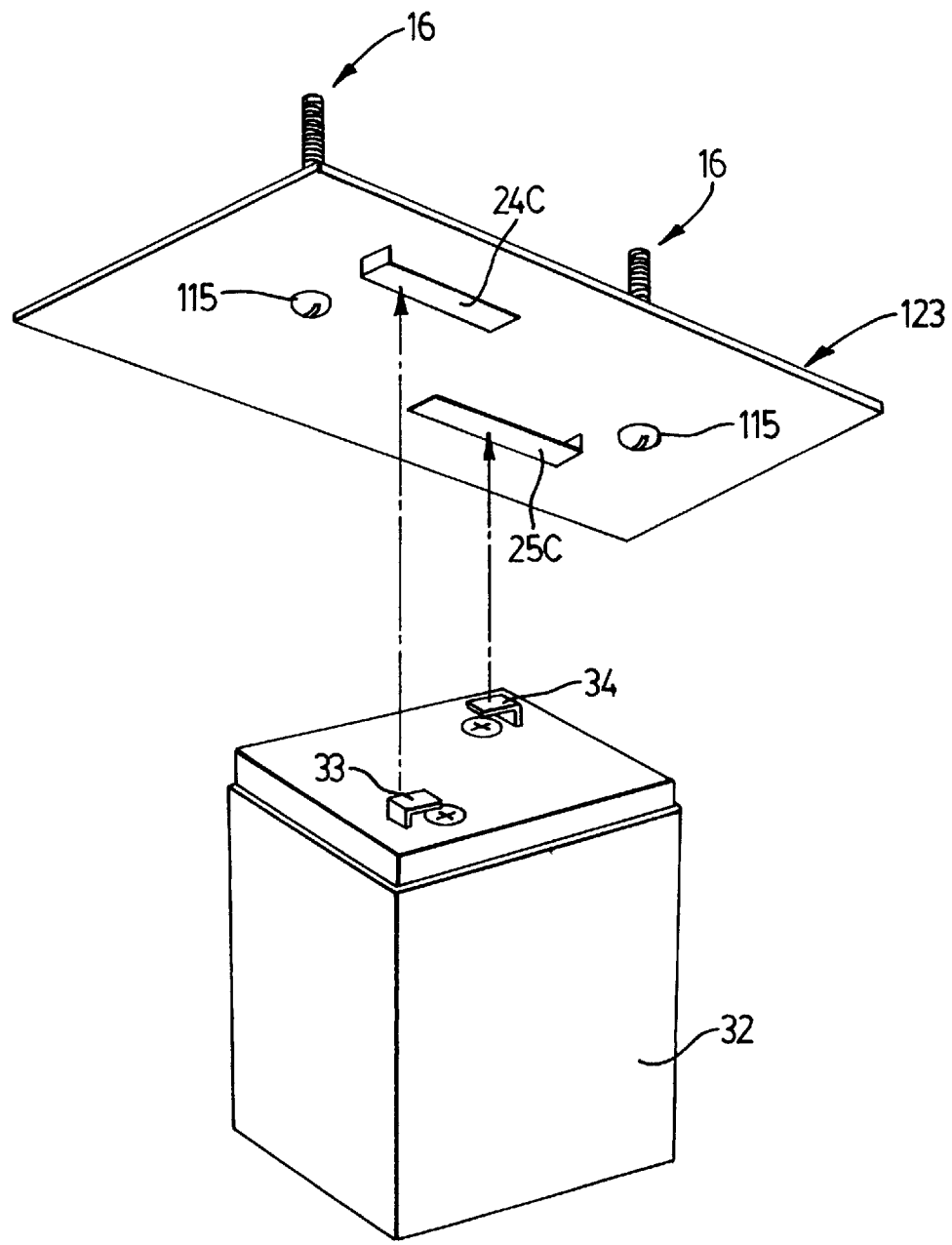
Figure 9:
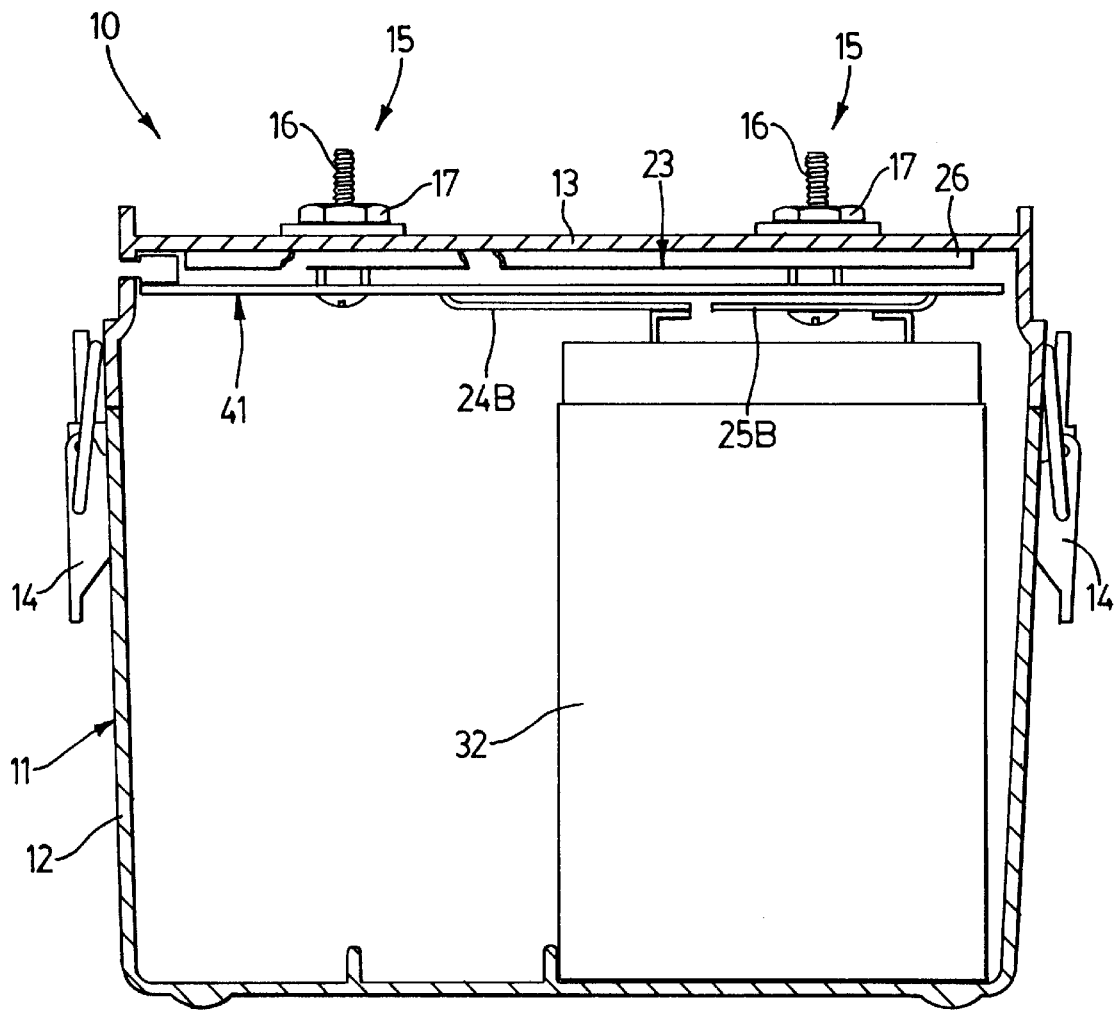
FIG. 9 is similar to FIG. 8A, but shows a different placement of the battery pack relative to the contact arrangement.

FIGS. 8A and 8B, by way of example only, illustrate a further possible way for the battery container 10 to accommodate solely a single aforesaid battery pack 32 simply by placing contact strips 24/24a and 25 by a single metal-laminated circuit board 123 having two holes 115 co-incident with terminals 15 on the top lid 13. On its one side contact strips or metal laminates 24c and 25c are directly placed overhead the terminals 33/34 of battery pack 32. These contact strips or metal laminates are electrically connected to the metal laminates (40/41) on its reverse side so that they are electrically connected directly, or indirectly through a re-charging receptacle, to terminal screws 16. In this case, electronic components may be included in circuit board for added features, including but not limiting to polarity-designation, re-charging warning signal and re-charging protection. An alternative placement of the battery pack 32 in relation to battery container 10 is illustrated in FIG. 9.

It is to be appreciated that the battery container of the present invention may be designed to transform any other type of battery packs to another type.

The invention has been illustrated by way of examples only, and still further modifications of and/or alterations to the described embodiments may be made by persons skilled in the art without departing from the scope of the invention as specified in the appended claims.

I claim:

1. A battery container for use with at least one battery pack having two terminals on one side, which container comprises a casing for accommodating a said battery pack and having on its outer side two terminals and on its inner side two associated contacts electrically connected to the terminals, which contacts are arranged for electrical connection with the respective terminals of a said battery pack when a said battery pack is placed inside the casing in any one of at least two possible orientations, each casing terminal being provided by a screw and an associated nut.

2. A battery container as claimed in claim 1, wherein the casing is substantially box-like.

3. A battery container as claimed in claim 2, wherein the casing has a lid having opposite outer and inner sides on which the casing terminals and contacts are provided, respectively.

4. A battery container as claimed in claim 1, wherein the contacts are elongate and lie on substantially the same plane.

5. A battery container as claimed in claim 3, wherein the contacts are elongate and lie on substantially the same plane.

6. A battery container as claimed in claim 1, wherein one of the contacts is provided substantially in a central position and the other contact is provided on one side.

7. A battery container as claimed in claim 5 wherein one of the contacts is provided substantially in a central position and the other contact is provided on one side.

8. A battery container as claimed in claim 1, wherein one of the contacts extends substantially around the other contact.

9. A battery container as claimed in claim 5, wherein one of the contacts extends substantially around the other contact.

10. A battery container as claimed in claim 1, including a contact adjuster provided by a plate and two contacts extending across opposite principal sides of the plate for connection between respective pairs of the casing contacts and battery terminals, irrespective of whether the contact adjuster is placed in any one of two possible orientations.

11. A battery container as claimed in claim 5, including a contact adjuster provided by a plate and two contacts extending across opposite principal sides of the plate for connection between respective pairs of the casing contacts and battery terminals, irrespective of whether the contact adjuster is placed in any one of two possible orientations.

* * * * *